United States Patent [19]
Kusunoki et al.

[11] 3,730,245
[45] May 1, 1973

[54] PNEUMATIC TIRE FOR HIGH-SPEED MOTORCYCLE

[75] Inventors: Sigeru Kusunoki; Yoshitsugu Murakami, both of Kodaira City; Yutaka Tashiro, Kuroiso; Kazuki Tabata, Akita, all of Japan

[73] Assignee: Bridgestone Tire Company Limited, Tokyo, Japan

[22] Filed: Mar. 10, 1971

[21] Appl. No.: 122,959

[30] Foreign Application Priority Data

Mar. 18, 1970    Japan ............................... 45/22467

[52] U.S. Cl. .......................... 152/352, 152/209
[51] Int. Cl. ................................... B60c 11/04
[58] Field of Search ............... 152/209, 209 D, 352, 152/353

[56] References Cited

UNITED STATES PATENTS

| | | |
|---|---|---|
| 1,862,269 | 6/1932 | Johnson ........................... 152/352 |
| 3,185,199 | 5/1965 | Klingemann et al. .............. 152/209 R |
| 3,162,229 | 12/1964 | Ellenrieder et al. .................. 152/352 |
| 3,384,144 | 5/1968 | Tiborcz ........................... 152/209 R |

*Primary Examiner*—Gerald M. Forlenza
*Assistant Examiner*—Richard A. Bertsch
*Attorney*—Fleit, Gipple & Jacobson

[57] ABSTRACT

A pneumatic tire for motorcycles, which provides a wide effective contact area with the road surface regardless of whether the motorcycle is in vertical or inclined posture. The tire includes a tread having a central groove extending along the tire equator, a pair of central ribs circumferentially extending along opposite sides of the central groove, and a plurality of independent blocks disposed on shoulder portions of the tread.

7 Claims, 15 Drawing Figures

PRIOR ART

Patented May 1, 1973  3,730,245
4 Sheets-Sheet 1
Fig. 1A PRIOR ART
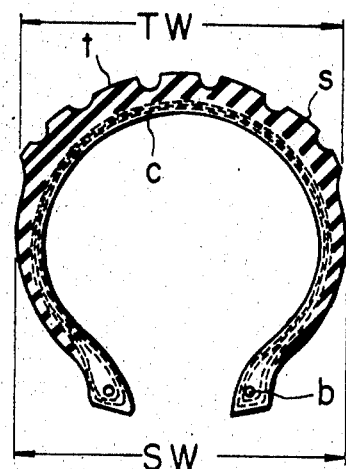
Fig. 1B PRIOR ART  Fig. 1C PRIOR ART
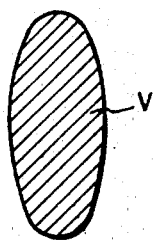 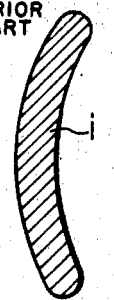
Fig. 2A PRIOR ART
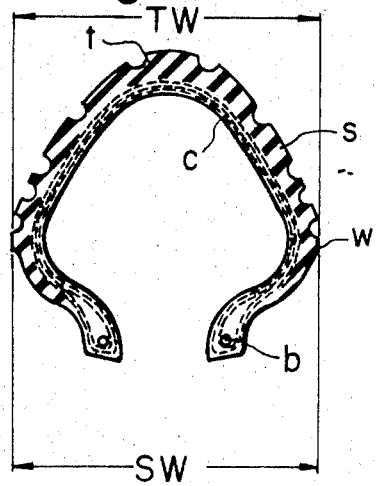
Fig. 2B PRIOR ART  Fig. 2C PRIOR ART
 
INVENTORS
Sigeru Kusunoki
Yoshitsugu Murakami
Yutaka Tashiro
Kazuki Tabata
BY Fleit, Gipple + Jacobson, ATTORNEYS

3,730,245

PNEUMATIC TIRE FOR HIGH-SPEED MOTORCYCLE

This invention relates to a pneumatic tire for motorcycles, and more particularly to an improved tire having excellent handling characteristics which is particularly suitable for use with high-speed motorcycles.

In order to improve the cornering characteristics of a pneumatic tire for motorcycles, it has been proposed in Japanese Pat. No. 450,360, which was patented to Dunlop Rubber Company Limited on July 9, 1965, to modify the conventional circular radial cross sectional shape of the tire into a semi-triangular form with a base on the rim side and a vertex on the outer peripheral portion of the tire, with substantially straight sides extending from the vertex to the base portion.

With such tire having the aforesaid modified cross sectional shape, the cornering characteristics can be improved. On the other hand, when a motorcycle equipped with such tires having a modified cross section runs straight, the width of the contact area between the tire tread and the road surface, taken at right angles to the straight driving direction, is comparatively narrow due to the triangular cross sectional formation. The narrow contact area between the tire tread and the road surface tends to reduce the stability of the motorcycle, so that slight unevenness on the road surface or lateral wind may cause the motorcycle to tilt. As a result of the tilt, the motorcycle tends to move along a curved path on one side of the straight path. Accordingly, the driver of the motorcycle tries to restore the straight path by turning the handle of the motorcycle toward the opposite side of the straight path. As a result, the bicycle might sometimes be swayed back and forth relative to a vertical plane along the straight path, which is rather dangerous for the driver, especially when the motorcycle speed is high.

If the driver is well experienced with the handling and running characteristics of the tire with the modified cross section, he may develop some techniques to cope with the aforesaid swaying. However, for those who have no experience with such tire with the modified cross section, the aforesaid swaying is difficult to control.

In other words, the tire with the modified semi-triangular cross sectional shape has a shortcoming in that it is susceptible to swaying in the case of running on a rough road or when exposed to lateral winds, which swaying cannot be coped with by drivers who are accustomed with regular tires.

Thus, there is a need for a pneumatic tire for high-speed motorcycles capable of providing excellent cornering and handling characteristics, which can conveniently be used by average drivers.

Therefore an object of the present invention is to meet such need by providing a pneumatic tire for high-speed motorcycles, which tire has excellent handling characteristics during cornering at a high speed, while ensuring high stability of motorcycles during their straight high-speed running.

Another object of the present invention is to provide a pneumatic tire of the type as referred to in the last paragraph, which has a high wear-resistance.

It is another object of the present invention to provide a pneumatic tire of the type as referred to in the last paragraph, which has an outstandingly high road-holding characteristics.

For a better understanding of the invention, reference is made to the accompanying drawings, in which:

FIGS. 1A, 2A and 3A are radial sectional views of tires, taken in a direction radiating from the axis of rotation of the tire, for a conventional regular motorcycle tire, a conventional high-speed motorcycle tire, and a tire for high-speed motorcycles according to the present invention, respectively;

FIGS. 1B, 2B, and 3B are diagrammatic illustrations of the contact area between road surface and the tire of a straightly running motorcycle, for the tires of FIGS. 1A, 2A, and 3A, respectively;

FIGS. 1C, 2C, and 3C are diagrammatic illustrations of the contact area between road surface and the tire of a motorcycle which is turning, for the tires of FIGS. 1A, 2A, and 3A, respectively;

Figure 3A:
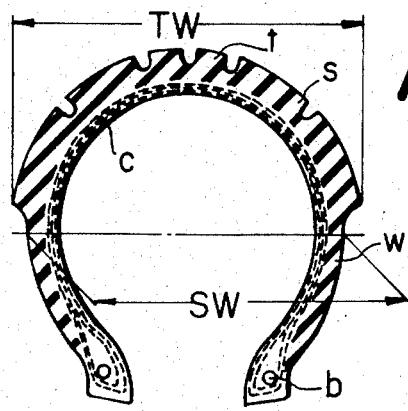

Cross sections of FIGS. 1A, 2A, and 3A represent the construction of a conventional regular motorcycle tire, a conventional high-speed motorcycle tire, and a tire according to the present invention, respectively. In each of the figures, a carcass C extends between a pair of beads $b$, so as to carry a rubber layer including a tread $t$, shoulders $s$ and sides $w$.

With the construction, as illustrated in FIG. 1A, the conventional regular motorcycle tire produces a contact portion $v$, as shown in FIG. 1B, when the motorcycle runs along a straight passage in a vertical posture. On the other hand, when the motorcycle makes a turn, its posture is inclined from the vertical, so that the contact portion between the road surface and the tire is changed into a different shape, as shown by another portion $i$ of FIG. 1C. Such change of the shape $v$ of the contact portion between the road surface and the tire is supposed to ensure stable running of the motorcycle for straight cruising. It is well known, however, that the shape of the contact portion $i$ of the conventional regular tire, as shown in FIG. 1C, cannot ensure reliable cornering characteristics, due to the smallness of its effective area.

To obviate such difficulties, a modification has been proposed in the aforesaid Japanese Pat. No. 450,360, in which the cross section of the tire is modified, as shown in FIG. 2A. In the formation of FIG. 2A, the shoulder portions S are made almost linear, together with the carcass C at the back thereof, so that the total area of contact portion $i$ between the road surface and the tire during the turning of the motorcycle with the modified cross sectional shape may be increased as compared with the corresponding total area of the contact portion $i$ of the conventional regular tire of FIG. 1C. With the increased total area of the contact portion $i$, the tire with the modified cross sectional shape has succeeded in improving the handling characteristics during the turning of a motorcycle. On the other hand, the linear formation of the shoulders S of the modified cross sectional shape act to reduce the width of the contact portion $v$ when the motorcycle stands vertically, as can be seen from the comparison of FIGS. 1B and 2B. Accordingly, the total area of the contact portion of the tire and the road surface during the linear cruising of the motorcycle is reduced, so that the stability of the motorcycle during such straight cruising is somewhat reduced.

Therefore, an object of the present invention is to improve the cornering characteristics of a motorcycle tire without using any peculiar cross sectional configuration, as shown in FIG. 2A. According to the present invention, the generally circular cross sectional shape of the tire is retained, for ensuring the high stability for straight cruising. Referring to FIG. 3A, in the pneumatic tire of the present invention, the width TW of its tread $t$ is selected to be very wide, for providing a large total area of contact portion between road surface and the tire, during the turning of a motorcycle.

The inventors have confirmed through experiments that, in order to achieve a cornering characteristics comparable with that of the aforesaid tire with the modified cross sectional shape by using the conventional cross sectional shape, the tread width TW must be wider than the maximum tire section width SW of the tire. By using such a wide tread portion $t$, a wide effective area of the contact portion $i$ for the turning conditions can be obtained, while retaining a wide effective area for the contact portion $v$ for the straight cruising condition, as shown in FIGS. 3B and 3C.

What is meant here by the maximum tire section width SW is an outside width of a tire which is taken in parallel with the axis of rotation of the tire on a radial plane emanating from the axis, the width being taken at such a position where similarly measured carcass width assumes its maximum value. Accordingly, the maximum tire section width SW thus defined corresponds to the sum of the maximum width of the carcass and twice the thickness of the rubber layer at the side portions $w$. The expression of "maximum tire section width" is widely used in the industry in the above defined meaning.

Figures 3B, 3C:
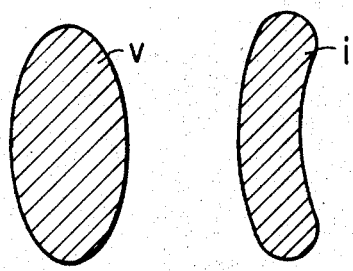

The effective area of the contact portion between the road surface and the tire according to the present invention is kept fairly large regardless of whether a motorcycle is in a vertical or inclined posture, as shown in the portion $v$ and $i$ of FIGS. 3B and 3C, respectively. With such large contact area with the road surface, the pneumatic tire of the present invention ensures excellent stability during high-speed straight running as well as excellent cornering and handling characteristics at the time of turning.

Another feature of the present invention is in its special tire pattern at the central portion of tire tread.

It has been a common practice in high-speed tires to provide ribs along the equatorial portion of the tire, or at the outermost portion with respect to the axis of rotation of the tire, but no grooves have been provided there in conventional high-speed tires. Such conventional tire pattern for high-speed motorcycles has been referred to as "the center-rib shoulder-block type" pattern. The reason for providing such center rib is in that it has been believed that center grooves along the tire equator are highly susceptible to groove cracks, and high-speed running of the motorcycle tends to increase the chance of causing groove cracks. In fact, with such understanding, center grooves have been considered as a taboo among designers of motorcycle tires.

On the other hand, in order to ensure high stability for high-speed straight running with the motorcycle in a vertical posture, it is desirable to have a large contact area with the road surface, as pointed out in the foregoing. The inventors have found that, in the case of motorcycle tires having a large contact area with the road surface when the motorcycle is at a vertical posture, the provision of center grooves is desirable due to the reasons as will be described hereinafter.

Figure 4A:
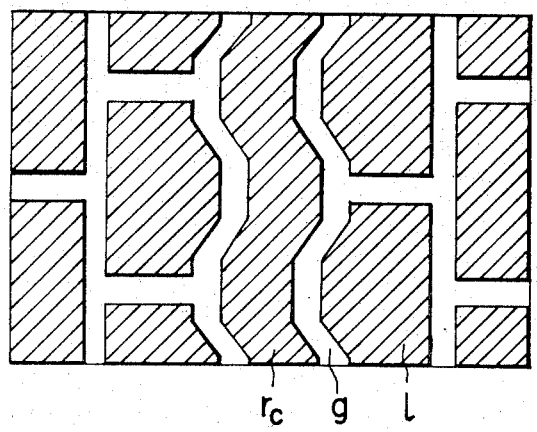
FIGS. 4A and 5A are expanded views of tire tread portions, illustrating tire patterns of a known tire and a tire according to the present invention, respectively.
Figure 4B:
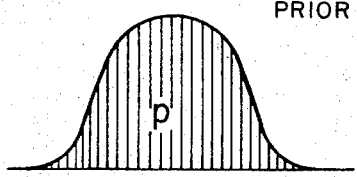
FIGS. 4B and 5B are schematic illustrations of the distribution of pressure at contact portions between road surface and tires, for tires of FIGS. 4A and 5A, respectively.
Figure 5A:
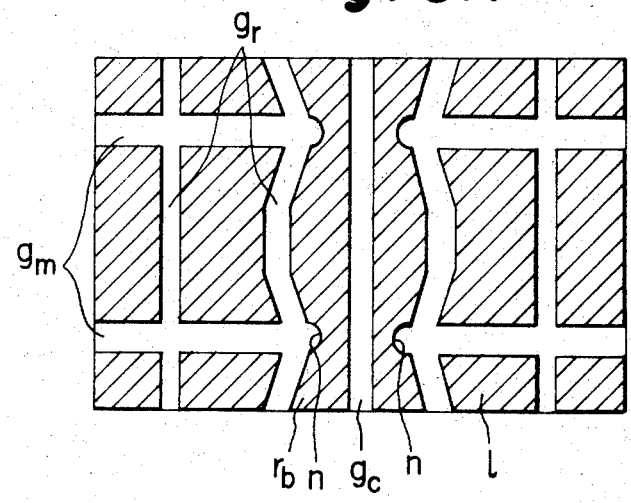

In FIGS. 4A and 5A, blocks $e$ can be formed on the tire tread either by ribs $r$ or by grooves $g$. In the case of conventional pneumatic tire pattern, as shown in FIG. 4A, center ribs $r_c$ are used, especially along the tire equator thereof. As a result, the contact portion of the conventional tire with the road surface produces a peak pressure at the central part of the contact portion, as shown in a contact pressure distribution diagram $p$ of FIG. 4B. On the other hand, the pneumatic tire for high-speed motorcycles according to the present invention uses a tire pattern including a center groove $g_c$ formed along the tire equator thereof, so that a pair of central ribs $r_b$ face with each other across the center groove $g_c$, as shown in FIG. 5A. With such tire pattern, the tire of the present invention gives a contact pressure distribution with the road surface which covers a much wider area than that of the conventional tire, as shown by another contact pressure distribution diagram $p'$ of FIG. 5B. Thus, the pneumatic tire of the present invention can provide a much larger effective area for the tire's contact portion with the road surface when the motorcycle is in a vertical posture, so as to ensure improved stability to the high-speed straight cruising of the motorcycle.

As regards the possibility of the groove cracks, which tire designers have been afraid of, the inventors have confirmed through experiments that the tire pattern, as shown in FIG. 5A, is substantially free from the occurrence of groove cracks. The reasons for such immunity of the pneumatic tire of the present invention to the groove cracks seems to be in that the operating conditions of high-speed motorcycles, such as internal pressure and external load, are much milder that those in the other heavy-load tires of rib type, for instance tires for trucks and buses. Furthermore, the comparatively thin formation of the tread rubber in the motorcycle tires contributes to such immunity to the groove cracks. In short, various test warranted that there is no serious groove crack problem in the pneumatic tires for high-speed motorcycles, according to the present invention.

It is another feature of the present invention that a special tire pattern, or tread pattern, is incorporated in the tire of the invention in the proximity of its tread shoulder portions. In general, the entire traction force of a motorcycle is borne by a rear tire alone. Due to such special requirement, motorcycle tires, especially rear tires, have been of center-rib shoulder-block type, and block patterns have been provided along the shoulders of their tread. Zig-zag patterns of block $e$ have been almost exclusively used in motorcycle tires, as shown in FIG. 4A, so that the shoulder blocks $e$ act to prevent excessive or unbalanced wearing of the tire tread $t$.

With the pneumatic tire of the present invention, the conventional zig-zag formation of the shoulder blocks $e$ is replaced by linear formation of independent blocks $e$, as shown in FIG. 5A. Thus, in the tire of the invention, independent blocks $e$ are aligned in the peripheral direction of the tire, as well as the radial direction thereof, and such independent blocks $e$ are divided by circumferential grooves $g_r$ and radial grooves $g_m$.

Figure 5B:

Such independent blocks $e$ behave like caterpillars in the contact portion $v$ and $i$ of the tire with the road surface, regardless of whether the motorcycle is in a vertical posture or in an inclined posture. As a result, the effective contact area with the road surface is increased, as compared with that of conventional tires, and hence, the road holding characteristics of the tire is greatly improved. The increased contact area of the tire with the road surface also contributes to the reduction of uneven wearing of the tire tread, because it modifies the concentrated contact pressure pattern $p$ of conventional tires into the more evenly distributed contact pressure pattern $p'$, as shown in FIGS. 4B and 5B, respectively. Such modification of the contact pressure pattern is largely accomplished by the special arrangement of the blocks $e$ in the tire tread, according to the present invention.

The road holding characteristics is particularly important in high-speed motorcycles, in relation to the dynamic lift generated by high-speed running of the motorcycles. More particularly, the dynamic lift increases with the square of the speed, and it is not so serious at low speed, but its effects at high speeds cannot be neglected. The dynamic lift acts to reduce the load to each tire, so that the road holding force tends to be reduced at high speeds, together with the traction.

In the case of motorcycles, the total load is comparatively small and only two wheels are used, so that the effective contact area of the tires with the road surface is rather small with comparatively light load per tire. Thus, the increase in the road holding force and in the traction according to the present invention makes a significant improvement of the performance of pneumatic tires for motorcycles.

In order to further improve the road holding characteristics, the present invention intends to enhance the caterpillar effects of the block $e$ of the tread $t$ by forming additional notches $n$ on the central ribs $r_b$ at the sides opposite to the central groove $g_c$, as shown in FIG. 5A. The notches $n$ are so disposed that each notch $n$ faces the radially outermost end of the corresponding radial groove $g_m$. Such notches $n$ provide narrowed portions in the central ribs $r_b$, preferably, at uniform intervals, so that comparatively wider portions of the central ribs $r_b$ cooperate with blocks $e$ on the shoulder portions of the tread for enhancing the caterpillar effects of the blocks $e$. Thereby, the road holding force of the pneumatic tire of the invention is further improved.

In order to confirm the performance of the tires of the present invention, comparative tests were made on specimens of the tire of the invention and the conventional tire. The specimens were of MC4.00-18 type for both conventional tire and the tire of the invention, which specimens were made of cords, each consisting of two 1,650 denier rayon filaments, disposed at a rate of 47 cords per 5 cm. The cord angle relative to the tire equator was 30° at the crown center. The differences between the specimens of the tire of the invention and conventional tire were restricted to the shape of radial cross section, i.e., the TW/SW ratio, and the tread patterns. The specimens were mounted on 2.15B type rims.

Figure 6:
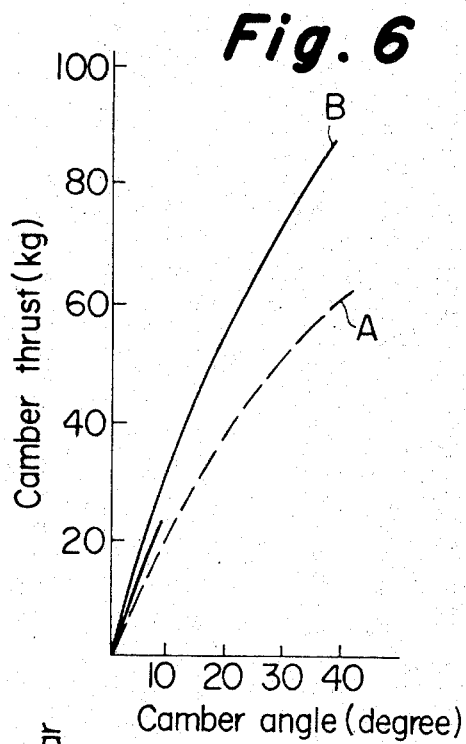
FIG. 6 is a graph, showing the camber-thrust characteristics of a tire according to the present invention, in comparison with the corresponding characteristics of a known tire.

Tests were made on the variation of the camber-thrust for different camber angles, with the internal pneumatic pressure of 2.2 Kg/cm². The results are shown in the graph of FIG. 6. In comparing Curve A of FIG. 6 representing the specimens of the tire of the present invention and Curve B representing the specimens of the conventional tire, the improvement achieved by the present invention is apparent.

The meaning of Curves A and B of FIG. 6 will now be elaborated. If a driver is on an motorcycle with an engine displacement capacity of not smaller than 500 cc, the load on each tire is about 130 Kg, provided that the load is evenly divided between the front and rear tires. If the motorcycle runs on a circular road with a radius of curvature of 400 meters, which road is not provided with a bank (or cant), and if a camber angle of 20° is assumed, the allowable maximum speed is 150 Km/hour with the tires of the present invention, while 120 Km/hour with the conventional tires, as calculated from the graph of FIG. 6. The corresponding maximum allowable speeds for a circular road with a 300-meter radius of curvature will be 130 Km/hour and 100 Km/hour, respectively. The road surface is assumed to be dry concrete having a friction coefficient of $\mu=0.9$ to 1.0. What is meant by the maximum allowable speed is that if the motorcycle runs at a speed in excess of such maximum allowable speed, the motorcycle will be expelled out of the road due to the centrifugal force.

In order to confirm the stability of the pneumatic tire of the present invention for straight high-speed cruising, feeling tests were made by a test driver through actual road running. It proved that the stability of the pneumatic tires of the present invention far exceeds that of the tires according to the aforesaid Japanese Pat. No. 450,360.

As described in the foregoing, the stability of high-speed motorcycles in straight cruising and the cornering characteristics can be improved by the special construction of the pneumatic tire according to the present invention, which is characterized in 1. that the tread width TW is sufficiently wider than the maximum tire width SW;
2. that a complex tire pattern consisting of a central groove $g_c$ formed along the tire equator and independent blocks $e$ along the tire shoulders;
3. that the central pattern consists of the circumferential central groove $g_c$ and a pair of central ribs $r_b$ facing with each other across the central groove $g_c$; and
4. that the tire shoulder pattern consists of independent blocks $e$ sectionalized by circumferential grooves $g_r$ and radial grooves $g_m$.

A preferable embodiment of the present invention is further characterized in 5. that notches $n$ are formed on the central ribs $r_b$ on the sides opposite to the central groove $g_c$, in such a manner that each notch $n$ faces the radially outermost end of the corresponding radial groove $g_m$.

Furthermore, the pneumatic tire of the present invention improves the road holding characteristics and the traction characteristics.

The aforesaid improvement of various operative characteristics of the pneumatic tire for high-speed motorcycles can, for instance, enables quick acceleration during high-speed running, which is necessary for passing ahead.

Figure 7:
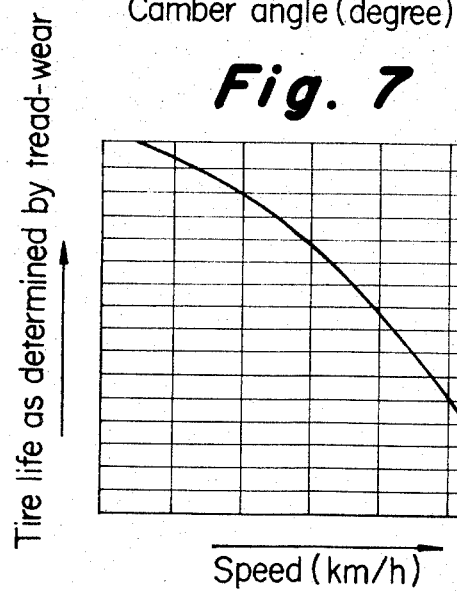
FIG. 7 is a graph, showing the relation between the running speed and the tire life as determined by tread wear.

Referring to FIG. 7, it is known that as the speed increases, the tire wearing also increases to shorten the service life of the tire, because various forces acting on a motorcycle, such as the driving force, braking force (in the driving direction), and the turning force (in the lateral direction), increase with the square of the speed. Furthermore, as a motorcycle runs faster, heat generation at the tire increases to raise the tire temperature for reducing its wear-resistivity. With the pneumatic tire according to the present invention, the average effective contact area with the road surface is larger than the corresponding area of conventional tires, inclusive of the tires of Japanese Pat. No. 45,360. Thus, the contact pressure, as taken per unit area, is smaller with the tire of the present invention than with the conventional tires, so that the tire wear can be reduced by the present invention. In view of the fact that the tire wearing is accelerated at high speeds, the special tire construction of the present invention is particularly effective in reducing high-speed tire wearing as compared with the corresponding high-speed wearing of the conventional tire. Since reduction of the tire tread wearing is longed for by users, the present invention contributes greatly to the industry.

What is claimed is:

1. In a pneumatic tire for high-speed motorcycles, a tread having a tread width wider than the maximum tire section width and comprising a central groove pattern formed along the tire equator and including a central groove along the equator and a pair of central ribs facing each other across the central groove, and a shoulder block pattern formed along shoulder portions of the tread and consisting of a plurality of independent blocks which are aligned axially and circumferentially in the shoulder portions of the tread, and separated by circumferential and axial grooves.

2. A tread according to claim 1 and further comprising a plurality of notches formed on the central ribs on the sides opposite to the central groove, the number of the notches on each side of the central groove being the same as the number of said axial grooves, each notch being so disposed as to face the radially outermost end of the corresponding axial groove.

3. A pneumatic tire for high-speed motorcycles, consisting of a pair of annular beads, a carcass extending between the beads, a rubber layer covering the entire outer surface of the carcass, and a tread integrally secured to circumferentially outer surface of the rubber layer, the width of the tread taken in parallel with the axis of rotation of the tire being wider than similarly taken maximum width of non-treaded portions of the rubber layer; the tread incorporating a central groove pattern including a central groove extending along the equator and a pair of central ribs facing with each other across the central groove, and a shoulder block pattern circumferentially formed on the tread shoulder portion and consisting of a plurality of independent blocks, which are aligned axially and circumferentially in the shoulder portions of the tread, and separated by circumferential and axial grooves.

4. A pneumatic tire according to claim 3, and further comprising a plurality of notches formed on the axially outer sides of the central ribs in such a manner that each notch faces the radially outermost end of a corresponding shoulder axial groove.

5. A pneumatic tire according to claim 3, wherein said circumferential grooves consist of two grooves one on each side of the central groove.

6. A pneumatic tire according to claim 3, wherein said axial grooves are made at uniform intervals.

7. A pneumatic tire according to claim 4, wherein said notches are made at the same uniform intervals as the axial grooves.

* * * * *